US008811993B2

(12) United States Patent
Alonso-Rubio et al.

(10) Patent No.: US 8,811,993 B2
(45) Date of Patent: Aug. 19, 2014

(54) METHOD AND ARRANGEMENT FOR SAVING RADIO RESOURCES

(75) Inventors: Jose Alonso-Rubio, Stockhol (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 816 days.

(21) Appl. No.: 13/120,741

(22) PCT Filed: Sep. 25, 2008

(86) PCT No.: PCT/SE2008/051076
§ 371 (c)(1),
(2), (4) Date: Mar. 24, 2011

(87) PCT Pub. No.: WO2010/036161
PCT Pub. Date: Apr. 1, 2010

(65) Prior Publication Data
US 2012/0208539 A1 Aug. 16, 2012

(51) Int. Cl.
*H04W 36/00* (2009.01)
*H04W 36/08* (2009.01)
*H04W 28/06* (2009.01)
*H04W 24/00* (2009.01)

(52) U.S. Cl.
CPC .............. *H04W 36/08* (2013.01); *H04W 28/06* (2013.01); *H04W 24/00* (2013.01)
USPC .......................................... 455/436; 370/312

(58) Field of Classification Search
CPC ............................ H04W 24/00; H04W 36/165
USPC ................ 455/436, 422.1, 440; 370/312, 331
See application file for complete search history.

(56) References Cited

U.S. PATENT DOCUMENTS

| 2003/0190916 | A1 | 10/2003 | Celedon et al. | |
| 2005/0197132 | A1* | 9/2005 | Lee et al. | 455/450 |
| 2009/0201882 | A1* | 8/2009 | Kim et al. | 370/331 |

FOREIGN PATENT DOCUMENTS

| WO | 03/005759 A1 | 1/2003 |
| WO | 2007/027033 A1 | 3/2007 |

OTHER PUBLICATIONS

3rd Generation Partnership Project. "Mobility in LTE-ARCHIVE State." 3GPP TSG RAN WG2#58bis, R2-072823, Orlando, FL, US, Jun. 25-29, 2007.

* cited by examiner

*Primary Examiner* — Phuoc H Doan
(74) *Attorney, Agent, or Firm* — Coats & Bennett, PLLC

(57) ABSTRACT

The present invention relates to an arrangement, a communication network node and a method of saving radio resources during handover in a communication network system comprising a plurality of communication network nodes (15a, 15b, 15c) communicating with one or more user equipments (18). Each network node (15a, 15b, 15c) is serving at least one cell (19) through and in which the user equipments (18) are moving. The method and arrangement is based on: collection of long term handover statistics (1); selective triggering of Multiple Cell Preparation (2); definition of a Secondary Target Cell List (3); exclusion from the Secondary Target Cell List of cells rarely used (4); preparation of the cells on the Secondary Target Cell List for handover (5).

20 Claims, 3 Drawing Sheets

METHOD AND ARRANGEMENT FOR SAVING RADIO RESOURCES

TECHNICAL FIELD

The present invention relates to a method and an arrangement in a communication network system as well as a communication network node in a communication network system and, more particular, to arrangements and communication network nodes allowing for saving radio resources as well as a method for such saving.

BACKGROUND

Wireless communication network systems usually comprise a plurality of Base Stations, defining one or more wireless coverage areas usually called cells or sectors. When a mobile User Equipment (UE) currently in wireless communication with a given base station starts to move out of the range of good wireless communication during the course of a call, the wireless network will attempt to find another base station, or another sector of the given base station, with which the mobile UE can continue wireless communication with minimal interruption. This process of transferring a mobile UE from one cell to another, or from one sector to another, is termed "handover" (HO)

Current standards for cellular mobile communications allow for preparing more than one target cell to receive a moving UE during handover. This is e.g. the case of inter Radio Access Technology (RAT) in Third Generation Partnership Project (3GPP) Long Term Evolution (LTE).

In LTE, even when more than one cell may be prepared for handover, via handover request messages, only one target cell is signalled to the UE, i.e. one dedicated preamble is sent in the handover command. The cell thus signalled will hereinafter be referred to as Primary Target Cell (PTC).

The other target cells, which have been prepared but not signalled to the UE, will hereinafter be referred to as Secondary Target Cells (STCs). Only in case the handover to the PTC fails the UE may try to access one of the STCs.

On handover failure, the UE attempts to re-connect to the best cell using the Radio Link Failure (RLF) recovery mechanism. This connection resumption succeeds only if the accessed cell is prepared, i.e. concerns a cell of the source network node or of another network node towards which handover preparation has been performed.

The best cell, receiving cell after handover failure, identifies the UE via the Cell Radio Network Temporary Identifier (C-RTI). The source cell (Cs) is identified via the Physical Cell Identity (PCI), which is not unique in the network, or the Global Cell Identity (GCI), which is unique in the network, if that is available at the UE.

If the best cell after handover failure is prepared for handover, it will inform the source cell of the arrival of the UE via a release resources message. It is assumed here that the source cell is also informed after a reconnection attempt to a non prepared cell, either by a specific message or implicitly by a UE context request.

However, there are some problems with the current solutions. Firstly, the set of STCs that are prepared for handover is a sub-set of a Neighbour Cell List (NCL), which lists a number of other wireless coverage areas to which handovers are preferably made. This sub-set of the NCL is hereafter called Secondary Target Cell List (STCL). Each prepared cell may need to allocate a dedicated preamble and reserve resources for a period of time. Secondly, a large STCL leads to an unnecessary load on the X2 interface interconnecting the cells, and reserved resources.

A way to reduce the cost of preparing a cell, would be having two different handover request messages for PTCs and STCs, but there will always be a cost associated with the procedure, e.g. additional signalling, and current standards do not allow for such a differentiation in the handover request message.

Document US 2003/0190916 A1 presents a method and system for optimizing a cell neighbor list in a CDMA system, wherein potential neighbor cells are removed from the cell neighbor list under certain conditions.

Document WO 2007/027033 A1 presents a method and apparatus for optimizing neighbor list automatically in synchronous CDMA network.

SUMMARY

Accordingly, one objective with the present invention is to provide an improved method of saving radio resources during handover in a communication network system comprising a plurality of communication network nodes communicating with one or more user equipments, where each network node is serving at least one cell through and in which the user equipments are moving.

According to a first aspect of the present invention this objective is achieved through a method as defined in the characterising portion of claim 1, which specifies that radio resources is saved by a method which comprises the steps of: collecting long term handover statistics; selectively triggering multiple cell preparation; defining a secondary target cell list; excluding from the secondary target cell list cells rarely used; and preparing the cells on the secondary target cell list for handover.

A further objective of the present invention is to provide an improved arrangement of saving radio resources during handover in a communication network system comprising a plurality of communication network nodes communicating with one or more user equipments, where each network node is serving at least one cell through and in which the user equipments are moving.

According to a second aspect of the present invention this further objective is achieved through an arrangement as defined in the characterising portion of claim 9, which specifies that radio resources is saved by an arrangement which comprises: means for collecting long term handover statistics; means for selectively triggering multiple cell preparation; means for defining a secondary target cell list; means for excluding from the secondary target cell list cells rarely used; and means for preparing the cells on the secondary target cell list for handover.

A yet further objective of the present invention is to provide an improved communication network node for enabling saving radio resources during handover in a communication network system comprising a plurality of communication network nodes communicating with one or more user equipments, where each network node is serving at least one cell through and in which the user equipments are moving.

According to a third aspect of the present invention this further objective is achieved through a communication network node as defined in the characterising portion of claim 17, which specifies that radio resources is saved by a communication network node which comprises: means for collecting long term handover statistics; means for selectively triggering multiple cell preparation; means for defining a secondary target cell list; means for excluding from the secondary target cell list cells rarely used; and means for preparing the cells on the secondary target cell list for handover.

Further embodiments are listed in the dependent claims.

Thanks to the provision of a method, an arrangement and a communication network node which provides for selective preparation for handover of a set of Secondary Target Cells to which handovers are preferably made, that are a sub-set of a Neighbour Cell List, several advantages, saving radio resources, may be allowed for, such as handling of multiple cell preparation during handover in a dynamic way, requiring no manual operation, where the choice of target cells is done based on real user experience, and which also mitigates the problem of having two neighbours with conflicting Physical Cell Identities, and solves specific problems related to handover failure, such as drop calls when entering a tunnel.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
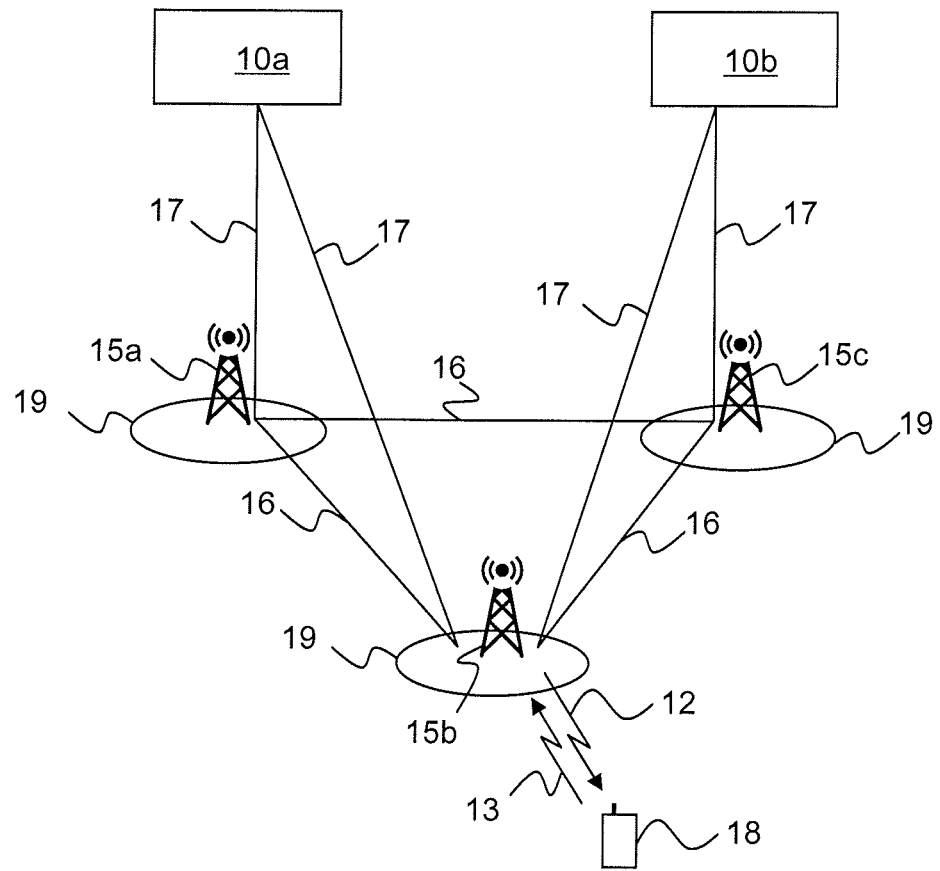
FIG. 1 shows a communication network architecture according to the present invention.

A communication system, such as a Long Term Evolution (LTE) system is shown in FIG. 1, including a Radio Access Network (RAN), comprising at least one Radio Base Station (RBS) (or eNode B) 15a, 15b and 15c. The eNbode Bs are connected over an interface such as the S1-interface 17 to at least one server gateway and mobility management entity node (S-GW/MME) 10a and 10b. The S-GW/MME node handles control signalling for instance for mobility, and is connected to external networks (not shown in FIG. 1) such as the Public Switched Telephone Network (PSTN) or the Integrated Services Digital Network (ISDN), and/or a connectionless external network as the Internet.

The RAN provides communication and control for a plurality of user equipments (UE) 18 (only one shown in FIG. 1) and each RBS 15a-15c is serving at least one cell 19 through and in which the UEs 18 are moving. The RBSs 15a-15c are communicating with each other over a communication interface 16, such as X2. The UEs 18 each uses downlink (DL) channels 12 and uplink (UL) channels 13 to communicate with at least one RBS over a radio or air interface.

According to a preferred embodiment of the present invention, the communication system is herein described as a LTE system. The skilled person, however, realizes that the inventive method and arrangement work very well on other communications systems as well, such as Wimax, HSPA, CDMA2000. The UEs 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

The present invention is based on the realisation that a Secondary Target Cell List (STCL), in order to economize radio resources, needs to be defined keeping the number of Secondary Target Cells (STCs) as low as possible while at the same time providing enough diversity against handover failure.

In accordance with the invention is proposed a method and an arrangement as a means to activate Multiple Cell Preparation (MCP) and set the STCL in a dynamic way by using real network traffic and feedback from UEs 18 involved in handover.

Long term statistics collected with the feedback received from STCs, Primary Target Cells (PTCs) and receiving cells as well as current-time UE 18 measurements are used in order to define the STCL.

In general there will be a STCL for each UE 18 performing a handover to a neighbour cell (Cn), i.e. PTC. The STCLs are created:

Individually for each neighbour, e.g. based on statistics, and/or

Individually for a particular UE 18 characteristic, e.g. other neighbours in the measurement report, UE 18 speed, UE 18 history, etc.

Hence a STCL is related to UE 18 and/or PTC involved in handover.

The proposed solution uses long term statistics, newly received measurement reports and a Neighbour Cell List (NCL) for triggering or not MCP and defining the cells in the STCL in that order. The process is defined in FIG. 2, which shows a block diagram of the proposed solution.

Figure 2:
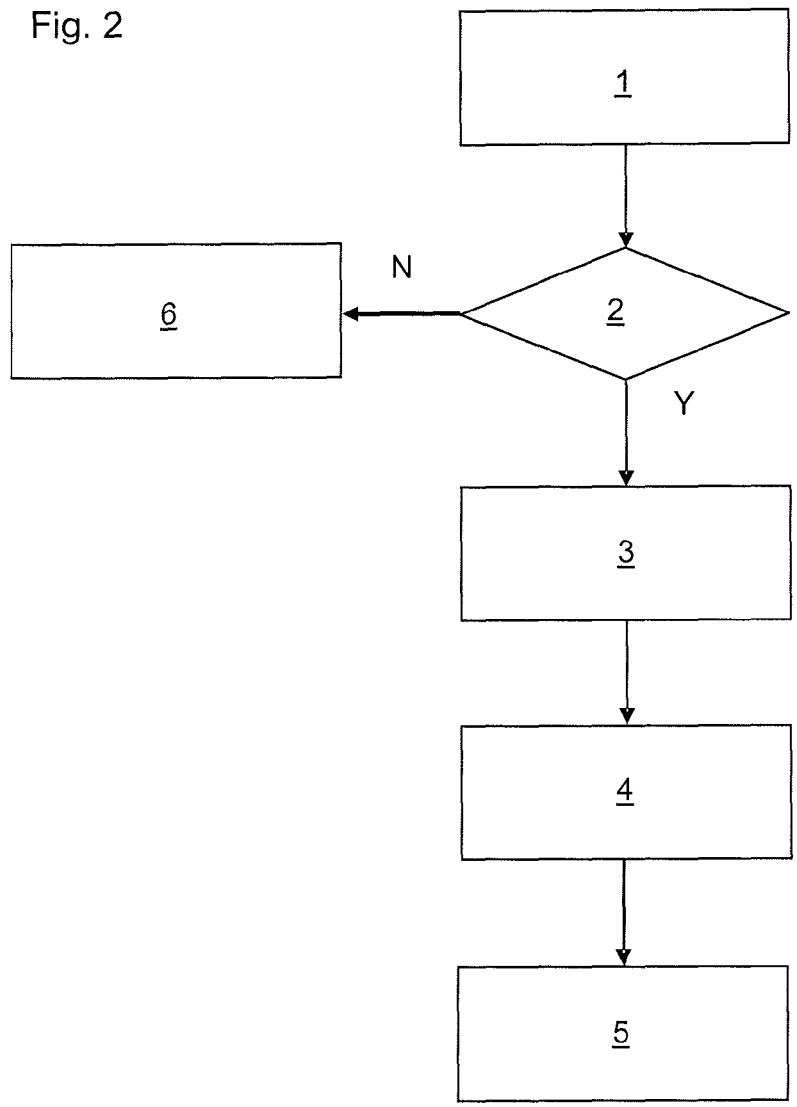
FIG. 2 illustrates a block diagram of the proposed solution.

The present inventive method is a method of saving radio resources during handover in a communication network system comprising a plurality of communication network nodes communicating with one or more UEs 18. Each network node is serving at least one cell through and in which the UEs 18 are moving. The method comprises the steps as illustrated in FIG. 2 and as below:

Step 1: Collection of long term handover statistics.
Step 2: Selective triggering of MCP.
Step 3: Definition of a STCL.
Step 4: Exclusion from the STCL of cells rarely used.
Step 5: Preparation of the cells on the STCL for handover.

In the following the step 1 of long term handover statistics collection will be described in further detail. Initially some concepts will be defined:

Recovered Handover (RHO): Failed handover to a neighbour cell Cn that was later recovered at another cell which was also prepared for handover.

Unrecovered Handover (UHO): Failed handover to a neighbour cell Cn that was intended to be recovered at another cell unsuccessfully because the receiving cell was not prepared for handover.

Lost Handover: Failed handover for which no recovery information has been received, e.g. because the UE 18 was switched off or went to a coverage hole.

For each neighbour cell Cn a register is created containing statistics for the last period of time T, in the order of days, hours, containing:

Number of triggered handovers to cell Cn
Number of failed handovers to cell Cn
    Percentage of recovered handovers to cell Cn from cell Ci (RHO)
        Percentage of handovers that ended up in target cell (RHOCn_Cn)

Percentage of handovers that ended up in source cell (RHOCn_Cs)
Percentage of handovers that ended up in cell Ci (RHOCn_Ci)
Percentage of handovers that ended up in cell Ci+1 (RHOCn_Ci+1)
... (etc.)
Percentage of unrecovered handovers (UHO) to cell Cn from Cell Ci
Percentage of handovers that ended up in cell Ci (UHOCn_Ci)
Percentage of handovers that ended up in cell Ci+1 (UHOCn_Ci+1)
... (etc.)
Number of failed handovers with unknown final destination (UDHO) to cell Cn, excluded intentionally from the named number of failed handovers.
Times Cell Ci (i+1, ... (etc)) was included in STCL for a handover to cell Cn (CountCn_Ci)

In the following the step 2 of selective triggering of MCP will be described in more detail by a number of triggering conditions.

First Triggering Condition.

A high number of failed handovers to a cell Cn indicates a need for MCP when handover is commanded towards that cell Cn.

For each cell in the NCL a threshold $HOFail_{MAX}$ for activating MCP is defined. $0 \leq HOFailMAX \leq 1$ If the handover failure rate (URHOR) from source cell to target cell is higher than $HOFail_{MAX}$, MCP for cell Cn is triggered.

MCP Triggering Condition:

$$URHOR_{Cn} = \frac{nrOfFailedHOtoCell\_n}{nrOfTriggeredHOtoCell\_n} > HOFail_{MAX}$$

Second Triggering Condition.

A low value of Reference Symbol Received Power (RSRP) may also trigger MCP for a particular UE 18 involved in handover, i.e. sending measurement reports.

If the value of RSRP of cell Cn is below an absolute threshold, $RSRP_{MIN}$, MCP is triggered.

$$RSRP_{Cn} < RSRP_{MIN}$$

Third Triggering Condition.

The value of Reference Symbol Received Quality (RSRQ) may be monitored instead of RSRP. A low value or RSRQ could also trigger MCP for a particular UE 18 involved in handover, i.e. sending measurement reports.

If the value of RSRQ of cell Cn is below an absolute threshold, $RSRQ_{MIN}$, MCP is triggered.

$$RSRQ_{Cn} < RSRQ_{MIN}$$

Fourth Triggering Condition.

A cell with neighbours presenting conflicting Physical Cell Identities (PCIs) could also trigger MCP.

This is a special case in which all the conflicting cells will be prepared for handover.

Optionally, in this special case the handover command may be sent with instructions to use a random preamble and not a dedicated one, i.e. no PTC is defined.

Hence, MCP will be triggered once determined that a UE needs handover and one of the above triggering conditions are met. If none of the above conditions are met, the method will divert to the step 6 of preparing only one cell for handover.

In the following the step 3 of defining a STCL will be described in more detail through conditions for adding a cell Ci to the STCL.

There is a STCL per each handover in the network for which MCP is triggered. The initial state of a STCL is empty and its nature is dynamic and may vary from handover to handover, even with handover to the same cell.

Several conditions for a cell Ci to be added to the STCL of a UE 18 performing handover to a PTC Cn may be defined. Each condition may or not add cells to the list, and the final result will be the combination of all the cells added by each condition. The nature of the conditions (percentages, number of appearances in the measurement report) will set a natural limit on the STCL size.

However, if another upper limit on the size is needed, a parameter maximum STCL size ($STCLSIZE_{MAX}$) may be defined.

First Cell Addition Condition.

A parameter defining a threshold for a potential STC Ci to enter the STCL of a handover of a UE 18 to a PTC Cn is defined, MaxFailsToCnEndedUpInCiRate.

$$0 \leq MaxFailsToCnEndedUpInCiRate \leq 1$$

After MCP has been activated, the cell Ci is added if the percentage of handovers that ended up in the cell Ci after a failed handover is higher than the previously defined threshold.

The number of handovers that ended up in Ci after a failed handover to Cn is calculated as the sum of the number of RHO and URHO in Ci that were directed initially to Cn.

$$nrOfHOFailedCn\_Ci = \frac{nrOfHOtoCell\_nRecoveredFromCell\_i +}{nrOfHOtoCell\_nUnrecoveredFromCell\_i}$$

$$\frac{nrOfHOFailedCn\_Ci}{nrOfFailedHOtoCell\_n} > MaxFailsToCnEndedUpInCiRate$$

Second Cell Addition Condition.

A parameter defining a threshold for a potential STC Ci to enter the STCL of a handover of a UE 18 to a PTC Cn is defined, MaxTriggeredToCnEndedUpInCiRate $$0 \leq MaxTriggeredToCnEndedUpInCiRate \leq 1$$

After MCP has been activated, the cell Ci is added if the percentage of handovers that ended up in the cell Ci after a triggered handover is higher than the previously defined threshold.

The number of handovers that ended up in Ci after a failed handover to Cn is calculated as the sum of the number of RHO and URHO in Ci that were directed initially to Cn.

$$nrOfHOFailedCn\_Ci = \frac{nrOfHOtoCell\_nRecoveredFromCell\_i +}{nrOFHOtoCell\_nUnrecoveredFromCell\_i}$$

$$\frac{nrOfHOFailedCn\_Ci}{nrOfTriggeredHOtoCell\_n} > MaxTriggeredToCnEndedUpInCiRate$$

Third Cell Addition Condition.

A parameter indicating the maximum power difference between PTC Cn and a potential STC Ci is defined ($PD_{MAX} > 0$ dB).

The cell Ci is added to the STCL if it appears strong compared to PTC Cn in the measurement reports.

If the difference in RSRP between the cell Ci and the PTC Cn in the measurement report(s) belonging to a particular handover is less than $PD_{MAX}$, the cell Ci is added to the STCL for that particular handover.

$$|RSRP_{Cn}-RSRP_{Ci}|<PD_{MAX}$$

Similarly, as a fourth triggering condition, the value of RSRQ could also trigger the addition of a potential STC Ci to the STCL, when the Quality Difference is under a threshold $(QD_{MAX})$.

$$|RSRQ_{Cn}-RSRQ_{Ci}|<QD_{MAX}$$

In the following the step 4 of excluding from the STCL cells rarely used will be described in more detail.

The step of exclusion is defined in order to avoid preparing cells which are never/seldom used even though they may have been included in the STCL under one of the previous conditions.

A parameter defining a threshold for a cell Ci to be excluded from any STCL is defined, MinRecHOCn_Ci.

$$0 \le MinRecHOCn\_Ci \le 1$$

A potential STC Ci is not considered to be added to a STCL if the percentage of handovers to a PTC Cn where the STC Ci was also prepared (CountCn_Ci) that actually ended up with a recovery at the STC Ci, (RHOCn_Ci) is lower than MinRecHOCn_Ci.

$$UHO_{Ci} = \frac{nrOfHOtoCell\_rRecoveredFromCell\_i}{Count_{Cn\_Ci}} < MinRecHOCn\_Ci$$

Finally, the step 5 of preparing the cells on the STCL for handover is performed. Through the inventive method allowing for the STCL being minimized in the above described way radio resources are saved during handover in the communication network as a limited number of STCs are prepared for handover.

Figure 3:
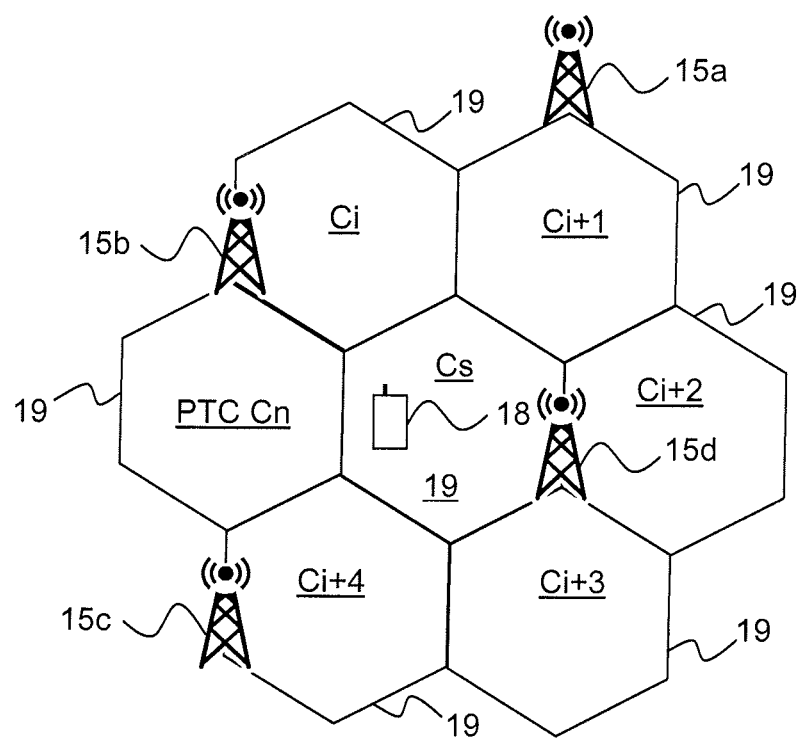
FIG. 3 shows a user equipment moving out of a serving cell recovering from radio link failure going to another prepared cell.

In FIG. 3, is shown a simplified Radio Access Network (RAN), comprising four Radio Base Stations (RBS) (or eNode B) 15a, 15b, 15c and 15d. The RAN provides communication and control for a user equipment (UE) 18 and each RBS 15a-15d is serving one or more cells 19 (Cs, Cn, Ci+1, Ci+2, Ci+3, Ci+4) through and in which the UE 18 is moving. The UE 18 is moving out of a serving cell Cs recovering from radio link failure targeting another prepared PTC Cn. In accordance with the present invention only the cells meeting the above requirements, e.g. cells Ci, Ci+1 and Ci+4, will be included on a STCL and thus prepared for handover, thus saving radio resources.

The present invention also relates to an arrangement of saving radio resources in a communication network system comprising a plurality of communication network nodes 15a, 15,b, 15c communicating with one or more UEs 18, where each network node 15a, 15b, 15c is serving at least one cell 19 through and in which the UEs 18 are moving. The arrangement comprises:
 means for collecting long term handover statistics;
 means for selectively triggering MCP;
 means for defining a STCL;
 means for excluding from the STCL cells rarely used;
 means for preparing the cells on the STCL for handover.

The above means for collecting long term handover statistics may be such as logging entities in the nodes. The statistics can be processed in the same node or the logs can be transferred to a central node instead. The means for preparing the cells on the STCL for handover may be such as message exchange through X2 or S1 interfaces. The means for selectively triggering MCP, and the means for defining a STCL and the means for excluding from the STCL cells rarely used may be data processing means controlled by algorithms, which data processing means run either on the nodes or in the central office.

The means for collecting long term handover statistics may further be arranged to:
 collect handover feedback from STCs;
 collect handover feedback from PTCs;
 collect handover feedback from receiving cells.

The means for selectively triggering MCP may further be arranged to trigger MCP if the collected statistics indicate that at lease one of the following apply:
 the handover failure rate from a source cell to a target cell is higher than a predefined threshold;
 if a measurement report sent from the UE 18 involved in handover indicates a RSRP value of cell Cn below a predefined threshold;
 if a measurement report sent from the UE 18 involved in handover indicates a RSRQ value of cell Cn below a predefined threshold
 if neighbouring cells are presenting conflicting PCIs.

The means for defining a STCL may further be arranged to add a cell Ci to the STCL of a UE 18 performing handover to a PTC Cn if at least one of the following conditions are met:
 the percentage of handovers that ended up in the cell Ci after a failed handover is higher than a predefined threshold;
 the percentage of handovers that ended up in the cell Ci after a triggered handover is higher than a predefined threshold
 the difference in RSRP between the cell Ci and the PTC Cn in the measurement reports is lower than a predefined threshold;
 the difference in RSRQ between the cell Ci and the PTC Cn in the measurement reports is lower than a predefined threshold.

The means for excluding from the STCL cells rarely used may further be arranged to exclude a cell Ci if the statistical percentage of handovers to the PTC Cn where the cell Ci also was prepared that actually ended up with a recovery at the cell Ci is lower than a predefined threshold.

The means for preparing the cells on the STCL for handover may be the standard means used for such preparations in the communication network system, which are well known to the person skilled in the art.

The present invention further relates to a communication network node for enabling saving radio resources in a communication network system comprising a plurality of communication network nodes 15a, 15,b, 15c communicating with one or more UEs 18, where each network node 15a, 15b, 15c is serving at least one cell 19 through and in which the UEs 18 are moving. The communication network node comprises:
 means for collecting long term handover statistics;
 means for selectively triggering MCP;
 means for defining a STCL;
 means for excluding from the STCL cells rarely used;
 means for preparing the cells on the STCL for handover.

The means embodied within the communication network node may be the same, and further arranged in the same way, as those described in relation to the above arrangement.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of saving radio resources during handover of a user equipment between cells in a communication network system, wherein each cell is served by a respective communication network node, wherein said handover is made from a source cell to one of a plurality of target cells included in a neighbor cell list, and wherein the method comprises:
    collecting long term handover statistics describing past handovers to one or more target cells included in the neighbor cell list;
    checking if a triggering condition is fulfilled for selectively triggering multiple target cells to prepare for the handoff;
    if the triggering condition is not fulfilled, preparing one primary target cell included in the neighbor cell list for the handover; and
    if the triggering condition is fulfilled:
        defining, based on the long term handover statistics, a secondary target cell list that includes one or more secondary target cells to be prepared for the handoff, in case handoff to the primary target cell fails, adding a secondary target cell to the secondary target cell list if a cell addition condition is fulfilled and excluding a secondary target cell from the secondary target cell list if a cell exclusion condition is fulfilled, to thereby exclude secondary target cells that, as indicated by the long term handover statistics, are rarely used for handoff; and
        preparing the secondary target cells included in the secondary target cell list for the handover by sending handover request messages to those secondary target cells.

2. The method according to claim 1, wherein collecting long term handover statistics is based on at least one of:
    handover feedback received from secondary target cells;
    handover feedback received from primary target cells;
    handover feedback received from one or more receiving cells that have received handovers.

3. The method according to claim 1, wherein the triggering condition is fulfilled if the long term handover statistics indicate that a handover failure rate from the source cell to the primary target cell is higher than a predefined threshold.

4. The method according to claim 1, wherein the triggering condition is fulfilled if a measurement report sent from the user equipment indicates a reference symbol received power value of the primary target cell below a predefined threshold.

5. The method according to claim 1, wherein the triggering condition is fulfilled if a measurement report sent from the user equipment indicates a reference symbol received quality value of the primary target cell below a predefined threshold.

6. The method according to claim 1, wherein the triggering condition is fulfilled if two or more target cells included in the neighbor cell list present conflicting physical cell identities.

7. The method according to claim 1, wherein the cell addition condition is fulfilled with respect to a secondary target cell if at least one of:
    a percentage of past handovers that ended up in the secondary target cell after a failed handover is higher than a predefined threshold;
    a percentage of past handovers that ended up in the secondary target cell after a triggered handover is higher than a predefined threshold;
    the difference in reference symbol received power between the secondary target cell and the primary target cell, as indicated in measurement reports, is lower than a predefined threshold;
    the difference in reference symbol received quality between the secondary target cell and the primary target cell, as indicated in measurement reports, is lower than a predefined threshold.

8. The method according to claim 1, wherein the cell exclusion condition is fulfilled with respect to a secondary target cell if a recovery percentage of that secondary target cell is lower than a predefined threshold, said recovery percentage comprising the statistical percentage of failed handovers to the primary target cell that are recovered at the secondary target cell.

9. An arrangement of saving radio resources during handover of a user equipment between cells in a communication network system, wherein each cell is served by a respective communication network node, wherein said handover is made from a source cell to one of a plurality of target cells included in a neighbor cell list, and wherein the arrangement comprises:
    a logging entity configured to collect long term handover statistics describing past handovers to one or more target cells included in the neighbor cell list; and
    one or more data processors configured to:
        check if a triggering condition is fulfilled for selectively triggering multiple target cells to prepare for the handoff;
        if the triggering condition is not fulfilled, prepare one primary target cell included in the neighbor cell list for the handover; and
        if the triggering condition is fulfilled:
            define, based on the long term handover statistics, a secondary target cell list that includes one or more secondary target cells to be prepared for the handoff, in case handoff to the primary target cell fails, adding a secondary target cell to the secondary target cell list if a cell addition condition is fulfilled and excluding a secondary target cell from the secondary target cell list if a cell exclusion condition is fulfilled, to thereby exclude secondary target cells that, as indicated by the long term handover statistics, are rarely used for handoff; and prepare the secondary target cells included in the secondary target cell list for the handover by sending handover request messages to those secondary target cells.

10. The arrangement according to claim 9, wherein the logging entity is configured to:
   collect handover feedback from secondary target cells;
   collect handover feedback from primary target cells;
   collect handover feedback from one or more receiving cells that have received handovers.

11. The arrangement according to claim 9, wherein the triggering condition is fulfilled if the long term handover statistics indicate that a handover failure rate from the source cell to the primary target cell is higher than a predefined threshold.

12. The arrangement according to claim 9, wherein the triggering condition is fulfilled if a measurement report sent from the user equipment indicates a reference symbol received power value of the primary target cell below a predefined threshold.

13. The arrangement according to claim 9, wherein the triggering condition is fulfilled if a measurement report sent from the user equipment indicates a reference symbol received quality value of the primary target cell below a predefined threshold.

14. The arrangement according to claim 9, wherein the triggering condition is fulfilled if two or more target cells included in the neighbor cell list present conflicting physical cell identities.

15. The arrangement according to claim 9, wherein the cell addition condition is fulfilled with respect to a secondary target cell if at least one of:
   a percentage of past handovers that ended up in the secondary target cell after a failed handover is higher than a predefined threshold;
   a percentage of past handovers that ended up in the secondary target cell after a triggered handover is higher than a predefined threshold;
   the difference in reference symbol received power between the secondary target cell and the primary target cell, as indicated in measurement reports, is lower than a predefined threshold;
   the difference in reference symbol received quality between the secondary target cell and the primary target cell, as indicated in measurement reports, is lower than a predefined threshold.

16. The arrangement according to claim 9, wherein the cell exclusion condition is fulfilled with respect to a secondary target cell if a recovery percentage of that secondary target cell is lower than a predefined threshold, said recovery percentage comprising the statistical percentage of failed handovers to the primary target cell that are recovered at the secondary target cell.

17. A communication network node configured to enable saving of radio resources during handover of a user equipment between cells in a communication network system, wherein each cell is served by a respective communication network node, wherein said handover is made from a source cell to one of a plurality of target cells included in a neighbor cell list, and wherein the arrangement comprises:
   a logging entity configured to collect long term handover statistics describing past handovers to one or more target cells included in the neighbor cell list; and
   one or more data processors configured to:
      check if a triggering condition is fulfilled for selectively triggering multiple target cells to prepare for the handoff;
      if the triggering condition is not fulfilled, prepare one primary target cell included in the neighbor cell list for the handover; and
      if the triggering condition is fulfilled:
         define, based on the long term handover statistics, a secondary target cell list that includes one or more secondary target cells to be prepared for the handoff, in case handoff to the primary target cell fails, adding a secondary target cell to the secondary target cell list if a cell addition condition is fulfilled and excluding a secondary target cell from the secondary target cell list if a cell exclusion condition is fulfilled, to thereby exclude secondary target cells that, as indicated by the long term handover statistics, are rarely used for handoff; and
         prepare the secondary target cells included in the secondary target cell list for the handover by sending handover request messages to those secondary target cells.

18. The communication network node according to claim 17, wherein the logging entity is configured to:
   collect handover feedback from secondary target cells;
   collect handover feedback from primary target cells;
   collect handover feedback from one or more receiving cells that have received handovers.

19. The communication network node according to claim 17, wherein the cell addition condition is fulfilled with respect to a secondary target cell if at least one of:
   a percentage of past handovers that ended up in the secondary target cell after a failed handover is higher than a predefined threshold;
   a percentage of past handovers that ended up in the secondary target cell after a triggered handover is higher than a predefined threshold;
   the difference in reference symbol received power between the secondary target cell and the primary target cell, as indicated in measurement reports, is lower than a predefined threshold;
   the difference in reference symbol received quality between the secondary target cell and the primary target cell, as indicated in measurement reports, is lower than a predefined threshold.

20. The communication network node according to claim 17, wherein the cell exclusion condition is fulfilled with respect to a secondary target cell if a recovery percentage of that secondary target cell is lower than a predefined threshold, said recovery percentage comprising the statistical percentage of failed handovers to the primary target cell that are recovered at the secondary target cell.

* * * * *

UNITED STATES PATENT AND TRADEMARK OFFICE
CERTIFICATE OF CORRECTION

PATENT NO. : 8,811,993 B2
APPLICATION NO. : 13/120741
DATED : August 19, 2014
INVENTOR(S) : Alonso-Rubio et al.

It is certified that error appears in the above-identified patent and that said Letters Patent is hereby corrected as shown below:

On the title page item (75), under "Inventors", in Column 1, Line 1, delete "Stockhol" and insert -- Stockholm --, therefor.

In the specification,

In Column 6, Lines 56-58, delete " $nrOfHOFailedCn\_Ci = \dfrac{nrOfHOtoCell\_nRecoveredFromCell\_i\ +}{nrOFHOtoCell\_nUnrecoveredFromCell\_i}$ " and insert -- $nrOfHOFailedCn\_Ci = \dfrac{nrOfHOtoCell\_nRecoveredFromCell\_i\ +}{nrOFHOtoCell\_nUnrecoveredFromCell\_i}$ --, therefor.

In Column 7, Line 54, delete "15,b," and insert -- 15b, --, therefor.

In Column 8, Line 14, delete "at lease" and insert -- at least --, therefor.

In Column 8, Line 51, delete "15,b," and insert -- 15b, --, therefor.

Signed and Sealed this
Third Day of November, 2015

Michelle K. Lee
*Director of the United States Patent and Trademark Office*